(12) United States Patent
Heuer et al.

(10) Patent No.: US 7,584,172 B2
(45) Date of Patent: Sep. 1, 2009

(54) CONTROL FOR SELECTING DATA QUERY AND VISUAL CONFIGURATION

(75) Inventors: Carsten Heuer, Schriesheim (DE); Andreas Gross, Heidelberg (DE); Heike Guder, Walldorf (DE)

(73) Assignee: SAP AG, Walldorf (DE)

( * ) Notice: Subject to any disclaimer, the term of this patent is extended or adjusted under 35 U.S.C. 154(b) by 436 days.

(21) Appl. No.: 10/687,074

(22) Filed: Oct. 16, 2003

(65) Prior Publication Data

US 2005/0086207 A1    Apr. 21, 2005

(51) Int. Cl.
    *G06F 17/30*    (2006.01)
(52) U.S. Cl. .......................... 707/3; 707/102; 707/104.1
(58) Field of Classification Search .................. 705/26, 705/27; 715/203, 833; 709/219; 707/3, 707/5, 100, 104.1
See application file for complete search history.

(56) References Cited

U.S. PATENT DOCUMENTS

| | | | |
|---|---|---|---|
| 5,226,118 A * | 7/1993 | Baker et al. .................. 715/833 |
| 5,721,903 A * | 2/1998 | Anand et al. .................... 707/5 |
| 5,870,552 A * | 2/1999 | Dozier et al. ................ 709/219 |
| 6,185,588 B1 | 2/2001 | Olson-Williams et al. |
| 6,466,241 B1 | 10/2002 | Schindler |
| 6,859,909 B1 * | 2/2005 | Lerner et al. ................. 715/203 |
| 2003/0204449 A1 * | 10/2003 | Kotas et al. .................... 705/27 |
| 2004/0133342 A1 * | 7/2004 | Banker ........................ 701/200 |
| 2005/0154652 A1 * | 7/2005 | Bezos et al. ................... 705/27 |

OTHER PUBLICATIONS

Description of the "recently used file list" in Microsoft Word, printed from the "Help" menu.
Description of the AutoReport function in Microsoft Access, printed from the "Help" menu.
http://www.sap.info./public/en/article.php4/comvArticle-193333c63b489e3d93/en "Product management business scenario", Nov. 24, 1999.

* cited by examiner

*Primary Examiner*—Sana Al-Hashemi
(74) *Attorney, Agent, or Firm*—Mintz, Levin, Cohn, Glovsky & Popeo, P.C.

(57) ABSTRACT

Searches in data repositories are facilitated by a control displayed in a computer user interface. The control is capable of presenting a plurality of search options that a user can select for execution. Each search option specifies both an associated predetermined query to be performed on a data repository and an associated predetermined visual configuration for displaying a result of the predetermined query. An input from the user is received that selects one of the plurality of search options presented by the computer user interface control. The predetermined data repository query associated with the selected search option is performed, and the result of the query is displayed using the associated predetermined visual configuration. Search options having identical predetermined queries may be associated with different visual configurations. Search options associated with the same visual configuration may have different predetermined queries. The queries may be defined by the user.

19 Claims, 9 Drawing Sheets

Orders: value and number

Data View Displayed: by product (current month) — 204

More Info   Advanced Analysis — 400   — 402   404 — Data Topicality: 18.07.2003 15:02:12

| Product | Purchase order value | Number of Order Items |
|---|---|---|
| 00000000000000000000 | * | 72,0000 |
| Supply pipe to 5m (g | 8,00 EUR | 2,0000 |
| Casing | 12.000,00 EUR | 1,0000 |
| Pipelaying Prestres | 4,00 EUR | 1,0000 |
| Fly wheel--cast stee | 12,00 EUR | 3,0000 |
| Asbestos cement pipe | 8,00 EUR | 2,0000 |
| Spiral casing | 12,00 EUR | 3,0000 |
| Material with price | 0,00 EUR | 2,0000 |
| Service with price | 0,00 EUR | 1,0000 |
| Material without pri | 22,00 EUR | 1,0000 |
| Material with price | 0,00 EUR | 1,0000 |
| Material with price | 0,00 EUR | 0,0000 |
| Material with interl | 0,00 EUR | 0,0000 |
| Material with price | 0,00 EUR | 1,0000 |
| Oxygen | 4,00 EUR | 2,0000 |
| Simple Product | 2,98 EUR | 4,0000 |
| Enhanced slug for fl | 16,00 EUR | 2,0000 |
| Front wheel 19-6 | 2,80 EUR | 1,0000 |
| HD rear wheel 16-12 | 10,00 EUR | 2,0000 |
| HD GLAD BOY seat del | 8,00 EUR | 2,0000 |
| Paint Metallic - Red | 8,00 EUR | 1,0000 |
| Set up construction | 4,00 EUR | 0,0000 |
| Tapping clip 2" | 0,00 DM | 1,0000 |
| Warm process | 4,00 EUR | |

Row   1/26   — 406

Orders: value and number

Data View Displayed: by vendor and products

More Info    Advanced Analysis                                    Data Topicality: 18.07.2003 15:02:12

| Vendor | Product | Purchase order value | Number of Order Items |
|---|---|---|---|
| C.E.B.Berlin | 00000000000000000000 | 24.384,30 EUR | 37,0000 |
| | Casing | 12.000,00 EUR | 1,0000 |
| | Material with price | 0,00 EUR | 2,0000 |
| | Service with price | 0,00 EUR | 1,0000 |
| | Material without pri | 22,00 EUR | 1,0000 |
| | Material with price | 0,00 EUR | 1,0000 |
| | Material with price | 0,00 EUR | 0,0000 |
| | Simple Product | 2,98 EUR | 2,0000 |
| | Front wheel 19-6 | 0,00 EUR | 0,0000 |
| | HD rear wheel 16-12 | 10,00 EUR | 1,0000 |
| | Tapping clip 2" | 0,00 EUR | 0,0000 |
| | Not assigned | 0,00 EUR | 0,0000 |
| | Result | 36.419,28 EUR | 46,0000 |
| Gusswerke Gm' | 00000000000000000000 | 305,00 EUR | 27,0000 |
| | Supply pipe to 5m (g | 8,00 EUR | 2,0000 |
| | Pipelaying Prestres | 4,00 EUR | 1,0000 |
| | Fly wheel--cast stee | 12,00 EUR | 3,0000 |
| | Asbestos cement pipe | 8,00 EUR | 2,0000 |
| | Spiral casing | 12,00 EUR | 3,0000 |
| | Material with price | 0,00 EUR | 0,0000 |
| | Material with price | 0,00 EUR | 0,0000 |
| | Material with interl | 0,00 EUR | 0,0000 |
| | Oxygen | 4,00 EUR | 1,0000 |

Row 1/46

FIG. 6

Save View

Description

Technical Name

☐ Overwrite Existing View

☐ Save also as dataview with title:

Orders: value and number; Data from 18.07.2003 15:02:12

| | | | | | | | Vendor | Purchase order value | Number of Order Items |
|---|---|---|---|---|---|---|---|---|---|
| | | | | | | | C.E.B Berlin | 36.419,28 EUR | 46,0000 |
| | | | | | | | Gusswerke Gm | 395,80 EUR | 51,0000 |
| | | | | | | | Blacks AG | 0,00 EUR | 0,0000 |
| | | | | | | | Parts & Pipe | 237,00 EUR | 5,0000 |
| | | | | | | | schnell | 0,00 EUR | 0,0000 |
| | | | | | | | testlieferant1 | 274,24 DM | 3,0000 |
| | | | | | | | Overall Result | * | 105,0000 |

Calendar Year/Month
Material group
Product
Product category
Product description
Vendor
Key Figures Purchase order value, Number of Order Items Save View

CONTROL FOR SELECTING DATA QUERY AND VISUAL CONFIGURATION

TECHNICAL FIELD

The following description relates to user interface controls by which a user can select a data query and a visual configuration.

BACKGROUND

Various software solutions exist for accessing data stored in repositories such as databases. This software may collectively be referred to as database management systems, and they typically provide users with one or more ways of entering queries to be executed in the database. As one example, the user can formulate a query in a special query language that the system can execute. Another example is that the user enters values for specific fields as a query and the system retrieves the database records having those specified field values. The database management systems typically also provide for some form of visual display of the results from an executed query. In addition, there are applications sometimes referred to as "report writer" programs that offer a variety of tools for the user to design and define the layout of a report that includes the results of a database search. Database management systems typically are delivered without "content," that is, predefined queries and visual configurations for displaying results.

SUMMARY

The systems and techniques described here relate to searches in data repositories.

In a first general aspect, a method of facilitating searches in a data repository comprises displaying a control in a computer user interface that is capable of presenting a plurality of search options that a user can select for execution. Each search option specifies both an associated predetermined query to be performed on a data repository and an associated predetermined visual configuration for displaying a result of the predetermined query. An input is received from the user selecting one of the plurality of search options presented by the computer user interface control. The predetermined data repository query associated with the selected search option is performed. The result of the predetermined query is displayed using the predetermined visual configuration associated with the selected search option.

In selected embodiments, the predetermined query is performed on a result of an executed data repository query. This may allow the user to further focus on specific data in the initial search result that the user is interested in.

In certain embodiments, the displayed control presents a search option that is defined by the user.

In a second general aspect, a computer user interface comprises a control presenting a plurality of search options that a user can select for execution. Each search option specifies both an associated predetermined query to be performed on a data repository and an associated predetermined visual configuration for displaying a result of the predetermined query.

Systems and techniques described here may provide more effective data repository searching through convenient selection of a predetermined query and a visual configuration. Associating two or more search options with identical queries and different visual configurations may increase the flexibility in displaying data. Having different queries associated with the same visual configuration may improve consistency in displaying data. Including search options as "content" when delivering a data repository management system may shorten the time before the buyer can perform data repository searches.

The details of one or more embodiments are set forth in the accompanying drawings and the description below. Other features and advantages will be apparent from the description and drawings, and from the claims.

BRIEF DESCRIPTION OF THE DRAWINGS

FIGS. 2-6, 7A and 7B are examples of panels that can be displayed by the user interface shown in FIG. 1.

Like reference numbers in the various drawings indicate like elements.

DETAILED DESCRIPTION

Figure 1:
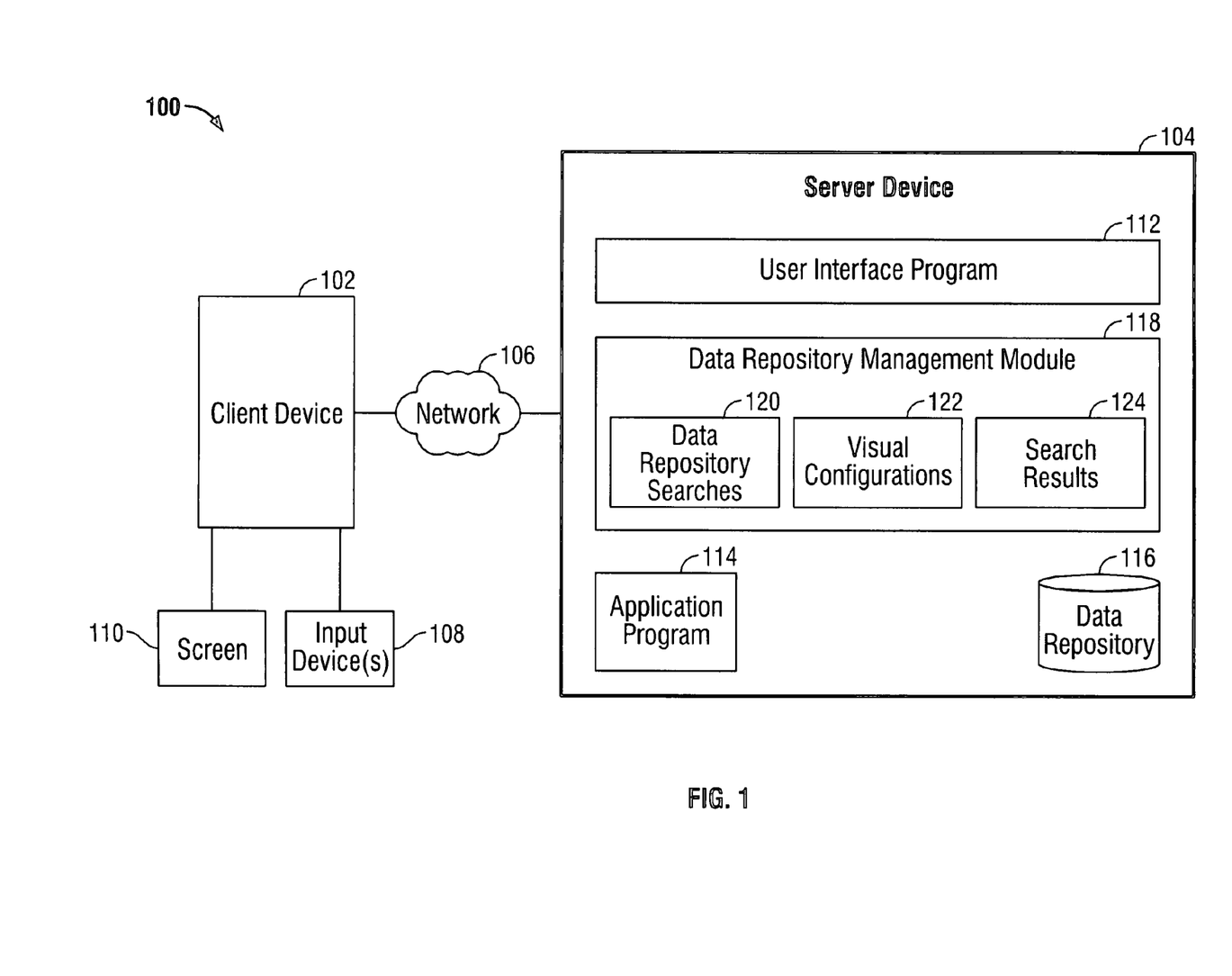
FIG. 1 is a block diagram of a computer system having a user interface.

FIG. 1 shows a computer system 100 comprising a client device 102 and a server device 104. The client and server devices can communicate over a network 106. A user can interact with the client and server devices using input device(s) 108 and a screen 1 0 operably connected to the client device 102. A user interface program 112, located on the server device in this example, is capable of providing one or more user interfaces displayable on the screen 110 by which the user can review information output by the computer system 100. In some implementations, part of the user interface program 112 may be located on the client device 102, such as when the client device 102 uses a conventional web browser that displays images on the screen 110 that were received from the server device in a format suitable for the web browser. Particularly, the user interface program 112 is capable of displaying a control on the screen 110 that presents search options specifying both a predetermined data repository query and a visual configuration for displaying a result thereof, as will be described below.

The computer system 100 may allow a user of the client device 102 to interact with at least one application program 114 provided by the server device. The application program 114 may be an order management program that employees of a business organization can use to enter, review and manage orders remitted by its customers, to name just one example. The server device 104 may store information that a user enters through the application program 114 in a data repository 116.

The nature of the data repository 116 may vary between different implementations. It may comprise structured or unstructured data. It may comprise a database, such as a hierarchic database, a relational database, or an object oriented database. In some implementations, the data repository 116 is located on a different device than the other units described in server device 104.

The data repository 116 can be managed using a data repository management module (DRMM) 118, located on the server device 104 in this example. Through the user interface program 112, functions of the DRMM 118 may be accessible to the user of the client device 102, who can run searches on the data in repository 116 and view the results of such searches. As an example, several application programs 114 may provide data to be stored in the data repository 116, and the DRMM 118 may conveniently provide the user access to search for, and review, any data in the data repository 116.

Data can be provided to the repository 116 also without using application program 114, such as by uploading it from a file.

The DRMM 118 may facilitate that the user can enter search queries to be performed on the data repository 116. The DRMM 118 may also provide predetermined data repository searches that the user can select to be performed. Such predetermined queries may be stored on the server device 104 as data repository searches 120 such that they can be selected for execution by a user of the computer system 100.

The types of searches that can be performed on data repository 116 depend on the nature of data stored therein. For example, the data repository 116 may comprise data that can be associated into key figures, such as a collective value of sales orders or the number of items included in specific sales orders. In such implementations, the data repository searches 120 may comprise a query that specifies one or more key figures to be determined from the data in data repository 116. Moreover, data that can be associated into key figures sometimes can be organized according to one or more characteristics, such as organizing the cumulative value of sales orders by vendor or by product, to name just a few examples. In such implementations, the data repository searches 120 may comprise queries for organizing the specified key figure(s) according to one or more characteristics.

Results of data repository searches can be presented to the user on the screen 110. It may be possible for a search result to be displayed in any of a number of different visual configurations. For example, visual configurations may include the search result being displayed in table form, as a map, as a chart, as a diagram, as a list of information, and other forms of visual data presentation including combinations of the ones mentioned. The visual configurations that the DRMM 118 can use may be stored as visual configurations 122 on the server device 104. The visual configurations 122 may specify the characteristics of how they are displayed, such as the number of rows in a table or the size of a chart. When one of the data repository searches 120 is associated with a specific visual configuration 122, the result of that search will be displayed with the associated visual configuration on the screen 110.

Data repository searches 120 can be executed both on repository data that has been gathered in a repository search and on "unfiltered" repository data, that is, data that was not gathered in a repository search. In other words, the user can begin by running a search in repository 118 and then run one of the data repository searches 120 on the result of that search. It is also possible to run one of the data repository searches 120 on the data in repository 118 without a preceding search. When a data repository search 120 is to be run on results from a previous repository search, those results may be stored as search results 124 on the server device 104. Preferably, the search results 124 are stored in cache memory, and not persistently, in system 100. The search results 124 in this example are shown as stored separately from the data repository 116, which may be the case when the DRMM 118 and the data repository 116 are located on separate physical devices. In other implementations, the search results 124 may be located in the data repository 116 where the query producing those results was performed.

The search results 124 may comprise aggregated data, that is, a collection of related data. A user may wish to perform additional queries on aggregated data to extract more specific information from it. For example, the aggregated data may comprise the individual values of all sales orders remitted by all vendors. Performing one of the data repository searches 120 on the exemplary search result 124 may allow the user to focus in more closely, or "drill down", on the specifics of the aggregated data that the user is interested in. As an example, the user may drill down on the aggregated data to target particular values of orders remitted by a certain vendor or orders for certain products.

Specific examples of data searching using the system 100 will now be described with reference to FIG. 2. A user interface panel 200 can be presented to the user on the screen 110 through the user interface program 112. The panel 200 lets a user select predetermined data repository queries and visual configurations for displaying results of such searches. The panel 200 includes a heading 202 which in this example is "Orders: value and number". This informs the user that the panel 200 can be used for triggering queries relating to values of orders registered in a data repository.

Below the heading 202 is a user interface control 204 by which the user can select any of a number of search options (in this example labeled "data views"). Each of the search options specifies both a predetermined data repository query and a predetermined visual configuration for displaying the results of the query. In this example, names of the search options are listed in a drop-down menu that appears if the user activates an icon 205 on the control 204. The visual configuration associated with a particular search option may be noted in the name of the search option, as will be described below.

A result display area 206 is located below the control 204. The area 206 is where the results of predetermined queries are displayed with the predetermined visual configuration. In the following examples, different queries and visual configurations will be described, and it will be seen that the search results may require more or less space for display in the panel 200 depending on the visual configuration and the amount of data resulting from a performed query.

Selecting a search option in the control 204 triggers the user interface program 112 to instruct the DRMM 118 to perform the data repository search 120 associated with the selected search option. The DRMM 118 will also be instructed to provide the search results for display with the selected visual configuration 122.

The currently selected search option in control 204 is labeled "by vendor (current year)". The text displayed for a search option in the control 204 represents the data repository query and the associated visual representation. The "by vendor" search option may have been selected by the user through the control 204 or it may be a default search option that is executed when the panel 200 executes is initiated. The results of the "by vendor" search option are currently displayed in the result display area 206.

The visual configuration associated with the "by vendor" search option is a table. In this example, the table comprises a Vendor column 208, a Purchase Order Value column 210 and a Number of Order Items column 212. For example, one of the vendors listed in the Vendor column 208 is "Parts & Pipe", whose purchase order(s) the Purchase Order Value column 210 lists as being worth 237 Euro. Going to the Number of Order Items column 212, it is seen that Parts & Pipe has ordered five items totaling the value listed in column 210. Other vendors in the column 208 have different purchase order values, and some of them have a zero order value.

An "Advanced Analysis" link 214 in the panel 200 relates to user defined search options and will be described later.

Figure 3:
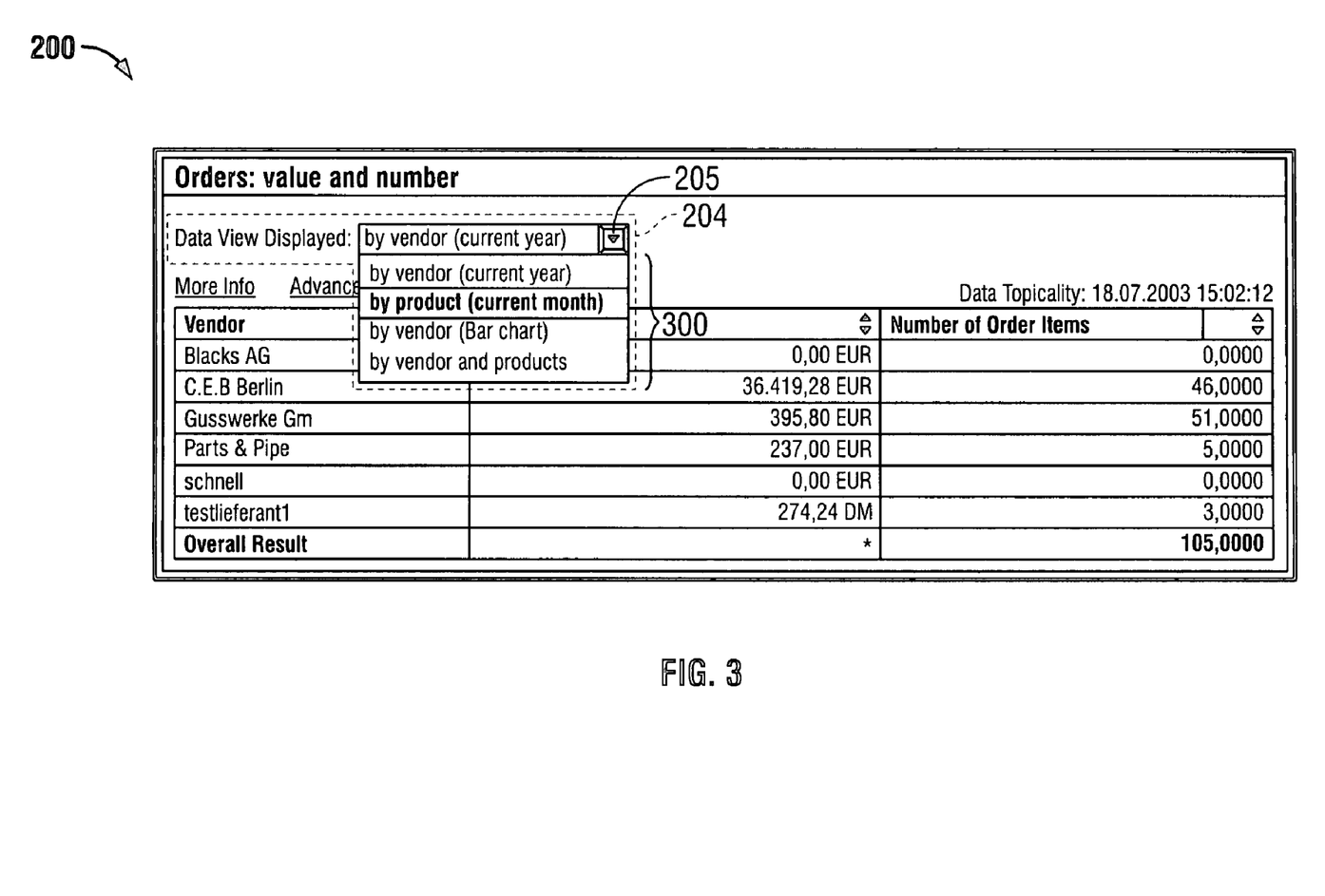

An example of how a user may select a search option in the control 204 is described with reference to FIG. 3. As mentioned earlier, the user may trigger the control 204 to display all available search options by activating icon 205. This can be done using input device(s) 108, such as a mouse or other pointer device. FIG. 3 shows the user interface panel 200 after the user clicks on the icon 205. The user interface program 112 displays a drop-down menu 300 under the control 204. The menu 300 presents the search options that the user can select between, in this example four search options. The most recently executed search option, "by vendor", is visible in the control 204 as it was before the user clicked on icon 205. In the FIG. 3 example, the user has dragged the cursor, using input device(s) 108, over the drop-down menu 300 and placed it on the search option labeled "by product (current month)". This triggers the user interface program 112 to highlight this search option. In other implementations, the control 204 can present more or fewer search options.

The control 204 is configured so that the user can select any of the search options using input device(s) 108. Here, for example, the user may input a selection by using the pointing device to click on a specific search option. Accordingly, when the search options are presented in the user interface, the user can input the selection of a search option using a single action.

Figure 4:
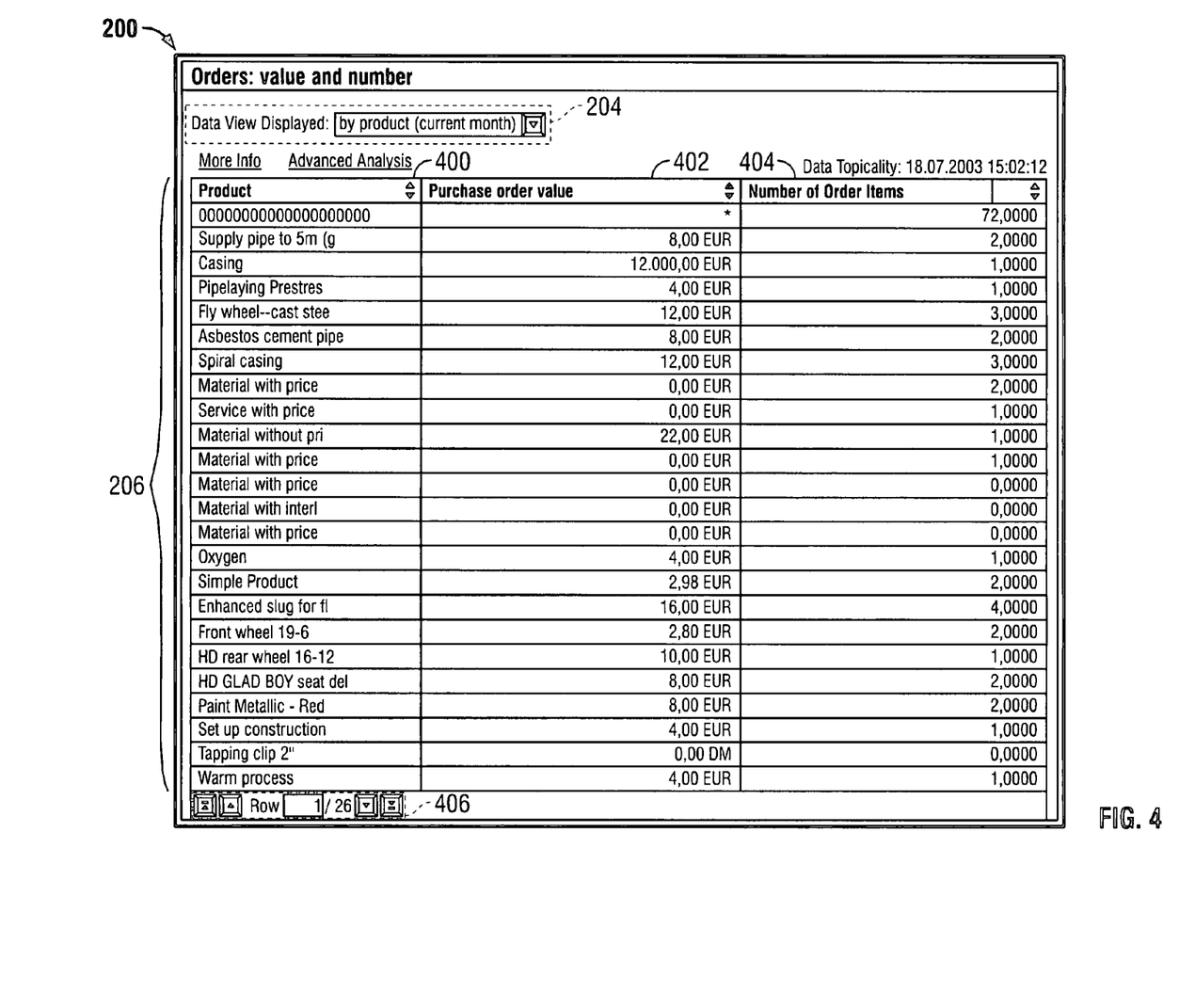

In this example, the "by product" search option selected in FIG. 3 is associated with a predetermined query for the order values associated with specific products, and the number of items ordered of each product. FIG. 4 shows the panel 200 after the selected predetermined query has been performed and the result is displayed. The control 204 now lists the text corresponding to the selected "by product" search option. The results of the predetermined query are displayed in result display area 206. The visual configuration associated with the selected search option is a table. In this example, the displayed table includes a Product column 400, a Purchase Order Value column 402, and a Number of Order Items column 404. The columns 402 and 404 in this example are similar to the columns 210 and 212 in FIG. 2, except that in FIG. 4, the Euro values and numbers of ordered items are displayed per product.

If the table (or any other visual configuration display) is too large for the available area on the screen 110, suitable scrolling mechanisms can be used by which the user can scroll to particular portions of the results. The table in this example includes a row selection control 406 at the bottom of the result display area 206 by which the user can navigate between rows in the displayed table.

Figure 2:
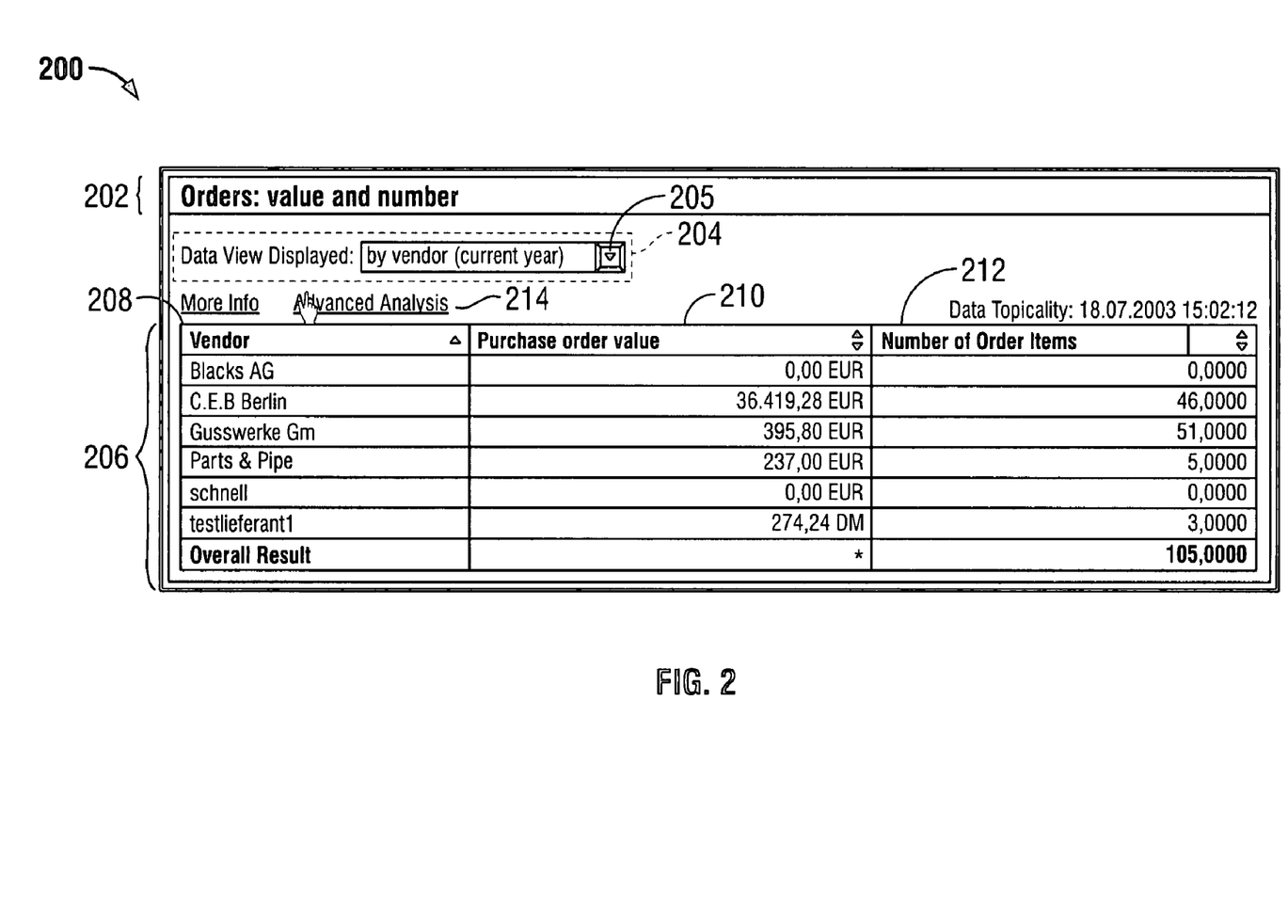

FIGS. 2-4 show an example of how predetermined data repository queries can be performed on existing search results 124. The user may first run a data repository search on the data repository 116 to obtain aggregated data, such as all data that relate to entered purchase orders. This data may then be stored as search results 124 and may be available for additional searching, or drill downs, by the user. Such additional searching may be facilitated by use of a control like the user interface control 204. For example, assume that a data repository search has been performed that gathered aggregated data relating to all sales orders. The panel 200 which is entitled "Orders: value and number" lets the user trigger further drill downs relating to the key figures of purchase order values and numbers of ordered items. Accordingly, FIG. 2 shows how the user may focus in more closely on the details of the key figures to obtain more specific information. Similarly, FIG. 4 shows how the user may focus in on the selected key figures to instead organize them by the individual products, a characteristic of the selected key figure.

Two or more search options associated with the same query may have different visual configurations, for example as will now be described. Referring briefly again to FIG. 3, the user may wish to select another search option among those listed in the drop-down menu 300. Assume, for example, that the user selects the "by vendor (Bar chart)" search option. By clicking on this search option, the user is triggering the predetermined data repository query associated with that search option to be performed by the DRMM 118. The selected search option also specifies that results of this particular query will be displayed as a bar chart.

Figure 5:
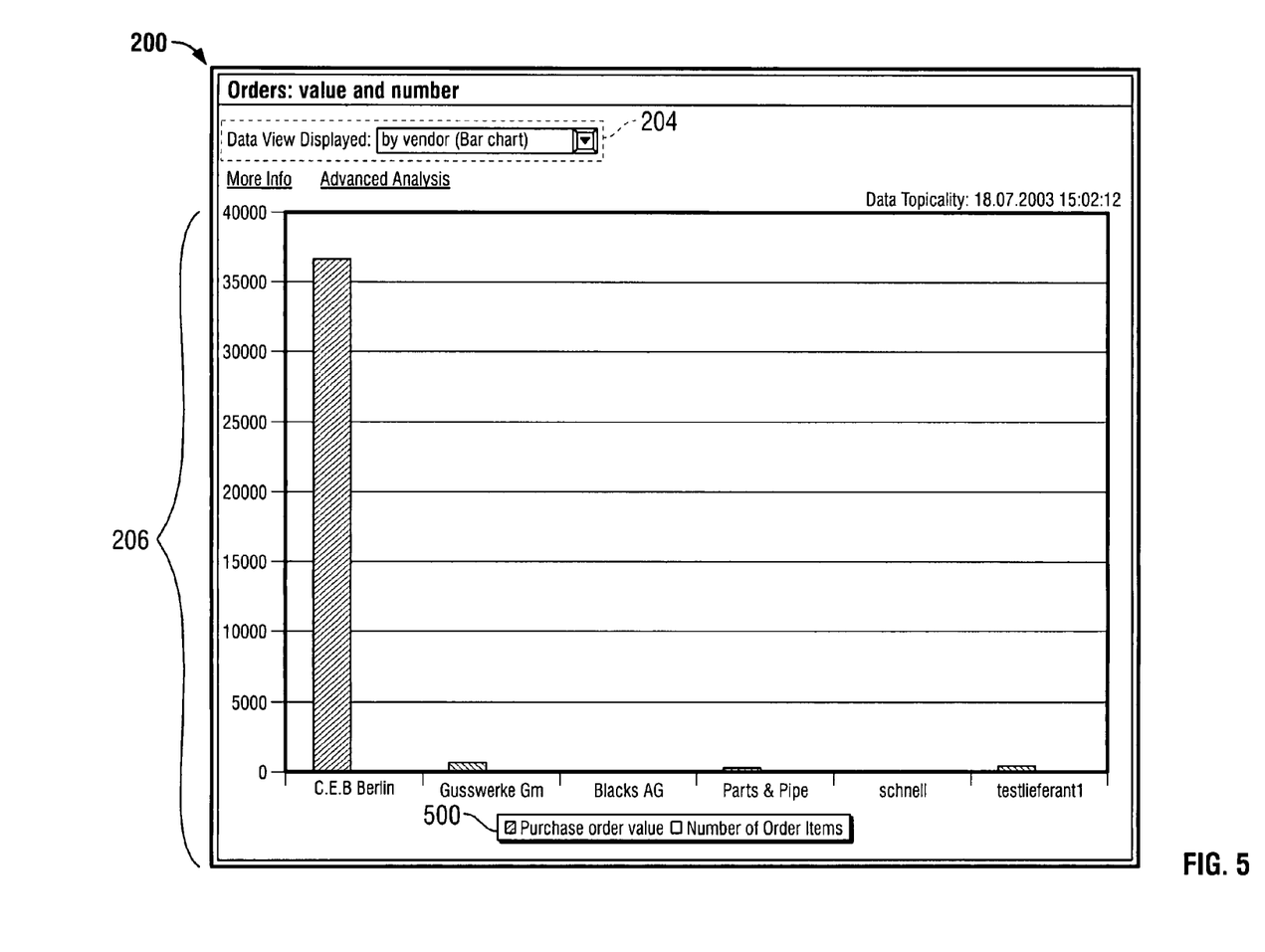

FIG. 5 shows the resulting display in the panel 200 after the "by vendor" search option is executed. The control 204 now displays the text of the selected "by vendor" search option. The result of the predetermined query is displayed in result display area 206. Here, the area 206 contains a bar chart because that is the visual configuration associated with the selected search option. In this exemplary bar chart, the vendors are listed along the horizontal axis, and the respective values and numbers corresponding to each vendor is shown as a bar having a specific height measured against the vertical axis. A legend 500 at the bottom of result display area 206 informs the user which of the bars represent purchase order values and numbers of ordered items, respectively.

The "C.E.B. Berlin" vendor has such a high order value in this example (36,419.28 Euro according to the table in FIG. 2) that the other vendors' bars—as well as C.E.B. Berlin's bar for number of items—are barely visible in the area 206. A graph with bars of very uneven height may be undesirable. This is one of the situations where it is advantageous to be able to conveniently switch visual configurations. When seeing this bar graph, then, the user can simply switch to a different visual configuration (such as a table) for the same data, assuming such the control 204 presents such a search option.

The search options selectable in the control 204 may involve the repository data being organized by one or more characteristics. An example of this will now be described where a user may select a search option that organizes purchase order data both by respective vendor and products. With reference again briefly to FIG. 3, the user may select the "by vendor and products" search option listed at the bottom of the drop-down menu 300. This triggers execution of a data repository query that gathers data for all entered purchase orders and displays the data query result with an associated visual configuration organized by both vendor and product, which in this example is a table.

Figure 6:
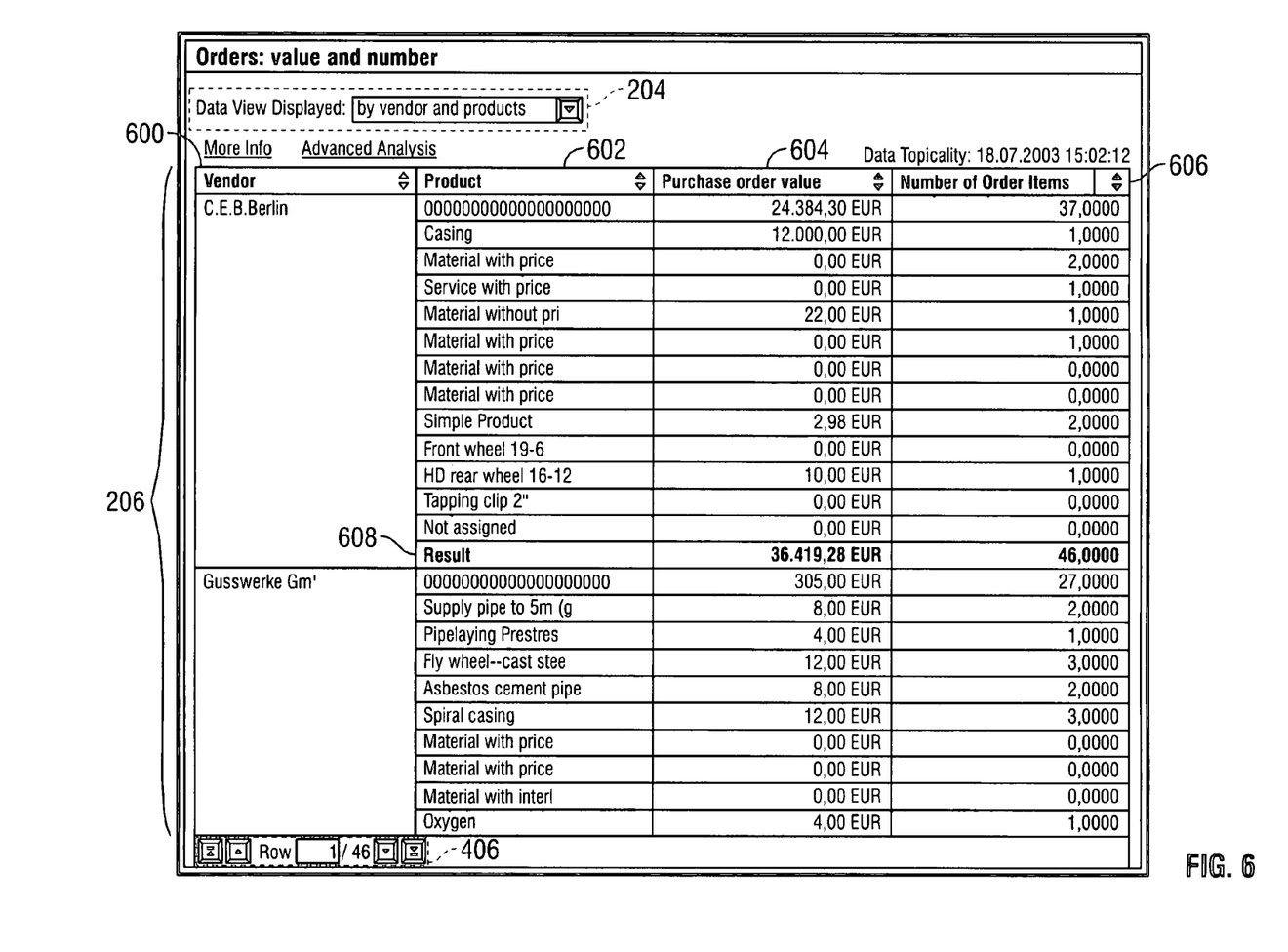

FIG. 6 shows the panel 200 after the user has input the selection of the "by vendor and products" search option using the control 204 and the result is displayed. The name of the selected search option is displayed in the control 204, and the result of the performed query is displayed as a table in result display area 206. The names of the vendors are listed in a Vendor column 600 and the names of the products ordered by the respective vendors are listed in an adjacent Product column 602. Accordingly, the products that have been ordered by a particular vendor, say "C.E.B Berlin", are listed in the Product column 602 next to that vendor's name in the column 600.

The table in area 206 contains a Purchase Order Value column 604 next to the Product column 602. The column 604 lists, for each vendor in column 600, the value of orders for the respective products listed in column 602. Next to column 604 is a Number of Order Items column 606 that lists, for each vendor in column 600, the number of items ordered of each product listed in column 602. For example, reviewing the table shows that vendor "C.E.B Berlin" has ordered one "Casing" product that corresponds to an order value of 12,000 Euro. The table contains a "Result" row 608 for each vendor, which sums up that vendor's order values and numbers of ordered items, respectively. The row selection control 406 at the bottom of result display area 206 lets the user navigate between different products and vendors contained in the displayed query result.

As seen from the FIG. 2 and FIG. 6 examples, one or more of the visual configurations 122 may be used for several search options in the control 204. That is, although the "by product" (FIG. 4) and "by vendor and products" (FIG. 6) search options are associated with different predetermined data repository searches 120, they use the same visual configuration 122 (here, a table). The visual configurations 122 may include other examples than the ones given above with regard to FIGS. 2-6. Examples of other visual configurations include a list of data being displayed in the result display area 206, or a map for the data resulting from the data repository query. For example, with reference to the FIG. 2 example above, where the data repository query involved organizing the key figures by vendor, it is possible to display this result as a map in result display area 206. That is, the user interface program 112 may display a map in the area 206 on which the locations for the respective vendors are identified. At the respective vendor locations, the corresponding data for that vendor are displayed. The values associated with the vendor, such as the order value and number of items ordered, may be displayed on the map as a number or as a bar similar to the ones in the FIG. 5 bar chart. Visual configurations 122 may include any visual configuration by which data resulting from any of the data repository searches 120 can be used.

The search options in the above examples are associated with predefined data repository queries and with predefined visual configurations, meaning that the user can select any of the search options without having to formulate the query or define its visual configuration. The control 204 offers a convenient way of focusing in on amounts of data to find the aspects that are of particular interest, especially when the user has limited skill in formulating database queries and defining their visual configuration. It may therefore be desirable to provide a user interface with search options as "content" with the DRMM 118 when it is sold. A customer who is inexperienced in database searching and wishes to review key financial data, such as perhaps a business executive of the customer organization, can conveniently focus in on the interesting aspects of large amounts of repository data.

In some implementations, the search options in the control 204 may be user defined. That is, search options—including their associated queries and visual configurations—can be defined by the user and stored such that they are presented by the control 204. If there are already search options in the control 204, the user may define search options in addition to them. The user may also modify or delete an existing search option.

Assume that the panel 200 is currently displayed as shown in FIG. 2. If the user wishes to custom define a search option, the user may click on the "Advanced Analysis" link 214. This triggers the DRMM 118 to generate another panel for display in the user interface, an example of which is shown in FIG. 7. The panel 700 lets the user define a new search option and save it to be accessible through control 204.

The panel 700 includes a saving area 702 where the user may control how the customized search option is saved. A visual configuration selection control 704 can be used for selecting a visual configuration to be associated with the search option. The selected visual configuration is displayed in visual configuration display area 706. A query selection control 708 lets the user define the query to be run on the repository data.

As an illustrative example, the user may proceed as follows. Assume that the user clicked the link 214 because the user wished to create a customized search option based on the "by vendor" search option that is shown in FIG. 2. At panel 700, then, the user may select a different visual configuration using the control 704. A "Table" icon 710 is currently selected in the control 704 because a "table" visual configuration is currently associated with the "by vendor" search option selected in FIG. 2. The user may let the Table icon 710 remain selected to keep the table visual configuration associated with this search option. The user may select a chart as the visual configuration using a "Chart" icon 712 as will be described below. If other visual configurations are available, they may be included in the control 704.

The user may use control 708 to change the repository search. As described above with reference to FIG. 2, the current repository search comprises querying for two key figures: purchase order value and numbers of ordered items. This corresponds to a specific entry in a "Key Figures" portion 708a of the control 708.

The control 708 includes a "Vendor" portion 708b by which the user can select to have the key figures arranged by vendor. The data in area 706 is currently organized by vendor. This corresponds to a selection of icon 709a in column 709. Icon 709a causes the search results in area 706 to be organized by vendor on the rows of the table. This selection can be undone by activating icon 709b, after which portion 708b would have two icons in column 709, like the other characteristics. A "Product Description" portion 708c lets the user arrange the key figures according to product descriptions. The control 708 includes a "Product category" portion 708d where the user can select to have the key figures organized by product categories. A "Product" portion 708e of the control 708 lets the user organize the key figures by product, which was described above with reference to FIG. 4. The control 708 includes a "Material group" portion 708f by which the user can have the key figures arranged by material group. Lastly, the control 708 includes a "Calendar Year/Month" portion 708g where the user can enter a specific year or month and restrict the repository query to that period. For each of the characteristics 708b-708g the user can select either of the two icons in column 709 to have the data organized by that particular characteristic either by rows or by columns. More than one of the characteristics 708b-708g can be selected, as was described above with reference to FIG. 6, where the key figures were organized both by vendor and by product.

Figure 7B:
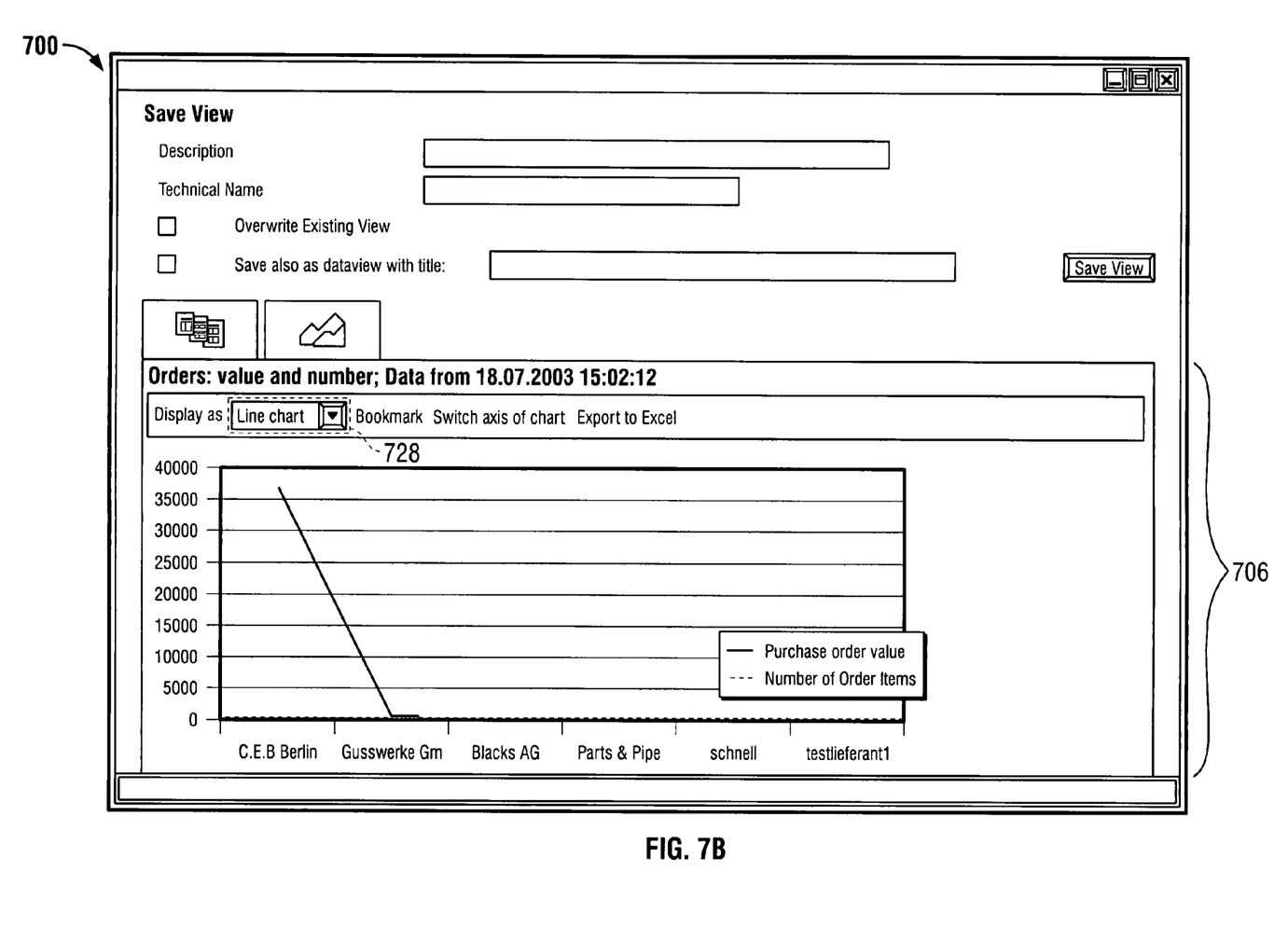

If the user selects chart icon 712, panel 700 may appear as shown in FIG. 7B. Area 706 currently displays a line chart of the repository data. Using a control 728, the user can select between other types of charts, such as pie chart(s), bar chart(s) and 3D chart(s). Thus, the user is able to try different visual configurations for the data. The user may add more visual configurations using the DRMM 118.

When the user is finished defining a search option in panel 700, the user may move to area 702 for selecting how to save the search option. The user enters a Description and a Technical Name in area 714. If the entered Technical Name already exists, the changes can only be saved if box 716 labeled "Overwrite Existing View" has been checked. If the user checks box 718 labeled "Save also as dataview with title:" and enters a title in field 720, then the search option defined in panel 700 will appear in control 204. The active visual configuration is identified and saved together with the data repository search as new search option. In parallel, the data repository search is saved under the given Description and Technical Name for optional use as an "initial" query on which drill downs can be performed.

Figure 8:
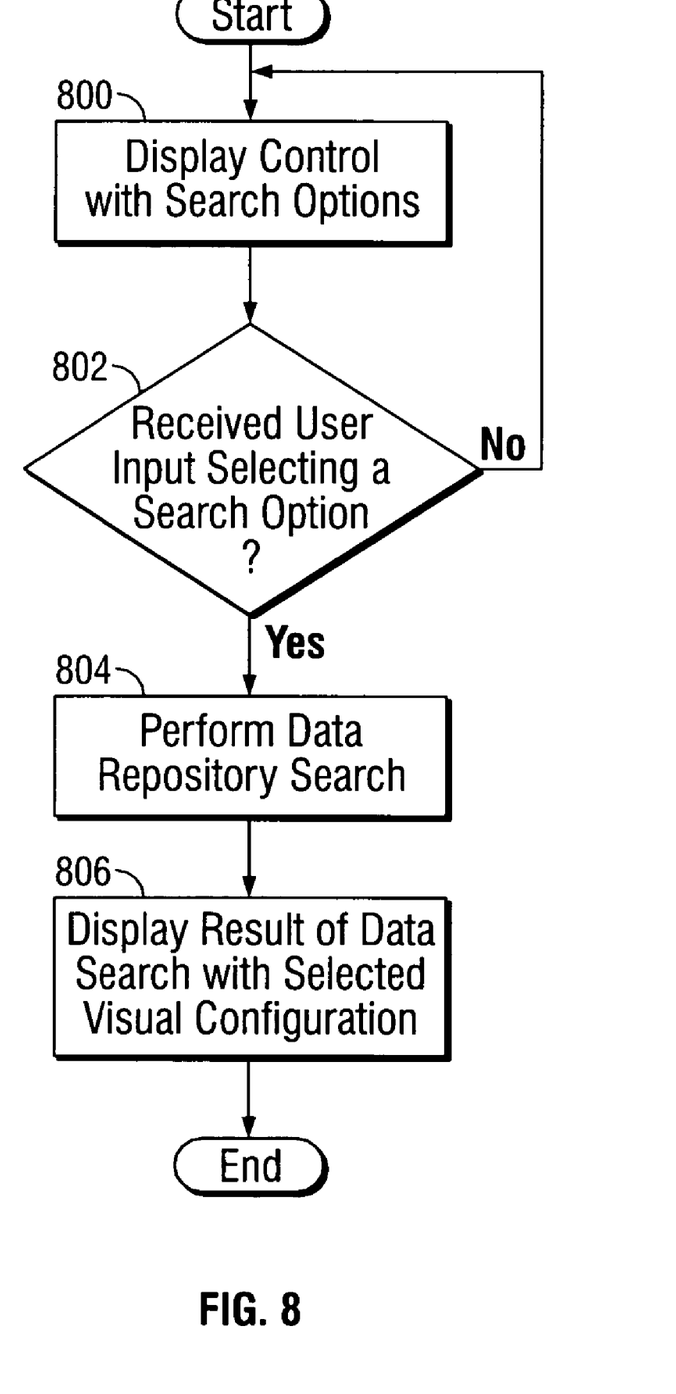
FIG. 8 is a flow chart of a process for facilitating searches in a data repository.

FIG. 8 is a flow chart of a process for facilitating searches in a data repository. At step 800, the control with search options is displayed in a user interface. Examples of this were described above with reference to FIGS. 2-6, where the display control 204 is capable of presenting search options that a user can select between. In step 802, the process determines whether a user input has been received that selects one of the search options. If such a user input is received, the process proceeds with step 804, where a data repository search specified by the selected search option is performed. As discussed above, this search may be performed on the data repository as a whole or on a specific portion thereof, such as on the results of a previous data repository query. If no user input selecting one of the search options has been received, the method returns to step 800. The control may display the search options after the user performs a certain operation, such as clicking on a drop-down menu control to view a list of menu options.

In step 806, the result of the specified data search is displayed with the visual configuration associated with the selected search option. This visual configuration may be a table, a chart, a list, a map, or combinations thereof. Some examples of such visual configurations were described above with reference to the result display area 206 in FIGS. 2-6. The user may select a different search option in the displayed control, and the method will again go through steps 804 and 806 using the predefined query and visual configuration associated with the newly selected search option.

Advantages of providing data repository searches through a control that is capable of presenting search options associated with both predetermined queries and predetermined visual configurations may include any of the following. More effective data repository searching through convenient selection of both a predetermined query and predetermined visual configuration. Increased flexibility in the visual display of data because the control can present two or more search options that are associated with identical queries and that have different visual configurations. Consistent display of search results and easy comparison between results from different repository searches because a visual configuration may be associated with several search options having different predetermined queries. Improved data repository management systems that include a functional search option control as "content" when they are delivered.

The systems and techniques described here can be implemented in digital electronic circuitry, or in computer hardware, firmware, software, or in combinations of them. Apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions by operating on input data and generating output. The described systems and techniques can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the described systems and techniques can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The systems and techniques described here can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the Internet.

The computer system can include clients and servers. A client and server are generally remote from each other and typically interact through a network, such as the described one. The relationship of client and server arises by virtue of computer programs running on the respective computers and having a client-server relationship to each other.

Other embodiments are within the scope of the following claims.

What is claimed is:

1. A method of facilitating searches in a data repository, the method comprising:
    displaying a control in a computer user interface, the control presenting a plurality of selectable search options that a user can select for execution, the plurality of search options each specifying and displaying in the control both an associated query to be performed on a data repository and an associated visual configuration for displaying a result of the query, parameters of the associated query and of the associated visual configuration for each search option being determined absent any other input from the user to formulate the associated query or define the associated visual configuration;
    receiving input from the user when the user, the input comprising selection by the user of one of the plurality of search options presented by the computer user interface control;
    performing the associated query of the selected search option and displaying the result of the associated query for the selected search option using the associated visual configuration for the selected search option.

2. The method of claim 1, wherein a first query specified in a first of the plurality of search options and a second query specified in a second of the plurality of search options are identical and a first visual configuration specified in the first of the plurality of search options and a second visual configuration specified in the second of the plurality of search options are different.

3. The method of claim 1, wherein a first visual configuration specified in a first of the plurality of search options and a second visual configuration specified in a second of the plurality of search options are identical and a query specified in the first of the plurality of search options and a second query specified in the second of the plurality of search options are different.

4. The method of claim 1, wherein the data repository comprises data associable into any of a plurality of key figures, and wherein the query specified by each of the plurality of search options specifies a key figure determined from the repository data.

5. The method of claim 4, wherein the repository data associated with the specified key figure is organizable according to a plurality of characteristics, and wherein the query specified by each of the plurality of search options specifies that the key figure data be organized according to at least one of the characteristics.

6. The method of claim 4, wherein the query specified by each of the plurality of search options specifies at least two key figures to be determined from the repository data.

7. The method of claim 1, wherein the data repository includes a result of a previously executed data repository query, and wherein the query selected by the user is specified to be performed on the result.

8. The method of claim 1, wherein the displayed control presents the search options in response to a prior input received from the user.

9. The method of claim 1, wherein the displayed control also presents a user-defined search option.

10. The method of claim 1, wherein the input received from the user comprises a single action using the displayed control.

11. A method of facilitating drill down queries comprising:
displaying a control in a computer user interface, the control presenting a plurality of selectable drill down options that a user can select for execution, the plurality of drill down options each specifying and displaying in the control both an associated drill down query to be performed on data gathered in a database query and an associated visual configuration for displaying results of the drill down query, parameters of the drill down query and of the visual configuration for each drill down option being determined absent any other input from the user to formulate the drill down query or define the visual configuration;
receiving a command input by the user selecting one of the plurality of drill down options presented by the computer user interface control;
performing the associated drill down query of the selected drill down option on the data and displaying the results of the associated drill down query for the selected drill down option using the associated visual configuration for the selected drill down option.

12. The method of claim 11, wherein the displayed control also presents at least one user-defined drill down option.

13. The method of claim 11, wherein the displayed control comprises a drop-down list box that the user can activate to present the plurality of drill down options.

14. A computer program product comprising executable instructions that when executed instruct a processor to perform operations comprising:
display a control in a computer user interface, the control presenting a plurality of selectable search options that a user can select for execution, the plurality of search options each specifying and displaying in the control both an associated query to be performed on a data repository and an associated visual configuration for displaying a result of the query, parameters of the associated query and of the associated visual configuration for each search option being determined absent any other input from the user to formulate the associated query or define the associated visual configuration;
receive input from the user when the user, the input comprising selection by the user of one of the plurality of search options presented by the computer user interface control;
perform the associated query of the selected search option and display the result of the associated query for the selected search option using the associated visual configuration for the selected search option.

15. The computer program product of claim 14, further comprising instructions that when executed cause the processor to perform operations comprising:
receive a user-defined search option and provide that the control presents both the plurality of predetermined search options and the user-defined search option.

16. The computer program product of claim 14, further comprising executable instructions for managing the data repository.

17. A method comprising:
displaying a control in a computer user interface, the control presenting a plurality of search options that may be selected by a user for execution, each search option of the plurality of search options specifying and displaying in the control an associated query to be performed on a data repository and an associated visual configuration for displaying a result of the associated query, parameters of the query and of the visual configuration for each search option being determined absent any other input from the user to formulate the query or define the visual configuration;
querying the data repository according to the associated query specified by one search option selected from the plurality of search options by the user;
displaying the result of the associated query using the associated visual configuration specified by the search option selected by the user; and
prompting the user to change one of the plurality of search options presented in the control or to define a new search option for presentation in the control, the new search option specifying one or more of a new associated query to be performed on the data repository and a new associated visual configuration for displaying a result of the new associated query.

18. A method as in claim 1, further comprising prompting the user to reconfigure one of the plurality of search options so that the reconfigured search option presents and displays in the control a first new combination of a first query and a first visual configuration for displaying results of the first query or prompting the user to define a second new search option for presentation and display in the control, the second new search option specifying both a second new associated query to be performed on the data repository and a second new associated visual configuration for displaying results of the second new query.

19. A method as in claim 11, further comprising prompting the user to reconfigure one of the plurality of drill down options so that the reconfigured drill down option presents and displays in the control a first new combination of a first associated drill down query and a first associated visual configuration for displaying results of the first associated drill down query in the control or prompting the user or prompting the user to define a second new drill down option for presentation and display in the control, the second new drill down option specifying both a second associated drill down query to be performed on the data repository and a second associated visual configuration for displaying results of the second associated drill down query.

* * * * *

UNITED STATES PATENT AND TRADEMARK OFFICE
CERTIFICATE OF CORRECTION

PATENT NO. : 7,584,172 B2  Page 1 of 1
APPLICATION NO. : 10/687074
DATED : September 1, 2009
INVENTOR(S) : Heuer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 750 days.

Signed and Sealed this

Fourteenth Day of September, 2010

David J. Kappos
*Director of the United States Patent and Trademark Office*